(12) United States Patent
Kaiser et al.

(10) Patent No.: US 12,038,126 B2
(45) Date of Patent: Jul. 16, 2024

(54) FRAME, MORE PARTICULARLY IN THE FORM OF A TRIPOD

(71) Applicants: Thomas Kaiser, Überbach (DE); Christian Wassermann, Ebenhofen (DE)

(72) Inventors: Thomas Kaiser, Überbach (DE); Christian Wassermann, Ebenhofen (DE)

(*) Notice: Subject to any disclaimer, the term of this patent is extended or adjusted under 35 U.S.C. 154(b) by 44 days.

(21) Appl. No.: 17/278,836

(22) PCT Filed: Oct. 6, 2019

(86) PCT No.: PCT/EP2019/000288
§ 371 (c)(1),
(2) Date: Mar. 23, 2021

(87) PCT Pub. No.: WO2020/069772
PCT Pub. Date: Apr. 9, 2020

(65) Prior Publication Data
US 2022/0034447 A1    Feb. 3, 2022

(30) Foreign Application Priority Data
Oct. 6, 2018   (DE) .................. 20 2018 004 631.0

(51) Int. Cl.
*F16M 11/34*   (2006.01)
*F16M 11/24*   (2006.01)
(Continued)

(52) U.S. Cl.
CPC .......... *F16M 11/242* (2013.01); *F16M 11/32* (2013.01); *A47B 13/02* (2013.01);
(Continued)

(58) Field of Classification Search
CPC ...... F16M 11/242; F16M 11/32; F16M 11/34; A47B 2200/0032; A47B 2200/003;
(Continued)

(56) References Cited

U.S. PATENT DOCUMENTS 549,457 A * 11/1895 Morgan ................. A47C 9/105
297/461
564,129 A *  7/1896 Wade .................... A47C 9/105
248/435

(Continued)

FOREIGN PATENT DOCUMENTS

DE            2163857 A1    6/1973

OTHER PUBLICATIONS

International Preliminary Report on Patentability for PCT/EP2019/000288, dated Apr. 15, 2021.

*Primary Examiner* — Nkeisha Smith
(74) *Attorney, Agent, or Firm* — Endurance Law Group PLC (57) ABSTRACT

To create a stable and safe frame, more particularly in the form of a tripod, having a plurality of rod-like legs (2), which are fastened centrally to a connection part (3), wherein the frame (1) can be folded up into a space-saving transportation position, in which the legs are oriented substantially in parallel, and the frame can be folded out into a usage position, in which the legs are crossed, the invention proposes that at least one concavely rounded support surface (5) for providing support over an area of the leg surface is arranged between the legs (2), more particularly that two support surfaces (5, 5') of this type are provided, which in the usage position are in contact with an area of the respective leg surface opposite one another.

19 Claims, 6 Drawing Sheets

(51) Int. Cl.
*F16M 11/32* (2006.01)
*A47B 13/02* (2006.01)
*A47C 7/00* (2006.01)
*A47G 7/04* (2006.01)
*F21V 21/06* (2006.01)
*F24C 15/08* (2006.01)

(52) U.S. Cl.
CPC ......... *A47B 2013/026* (2013.01); *A47C 7/002* (2013.01); *A47G 7/04* (2013.01); *F21V 21/06* (2013.01); *F24C 15/08* (2013.01)

(58) Field of Classification Search
CPC ... A47B 13/02; A47B 2013/026; A47B 3/002; A47C 7/002; A47C 9/105; A47G 7/04; F21V 21/06; F24C 15/08
USPC ............ 248/431, 188.1, 188.3, 188.5, 188.6, 248/188.7, 188.8, 188.91, 163.1, 163.2, 248/164; 297/188, 16.2, 451.1, 451.2; 108/118, 159, 128
See application file for complete search history.

(56) References Cited

U.S. PATENT DOCUMENTS

| | | | | |
|---|---|---|---|---|
| 948,533 | A * | 2/1910 | Swarts | A47C 9/105 108/128 |
| 1,172,439 | A * | 2/1916 | Crozier | A47C 4/286 297/461 |
| 1,241,987 | A * | 10/1917 | Kalisz | A47B 3/12 248/431 |
| 1,371,263 | A * | 3/1921 | Reed | A47B 13/04 248/150 |
| 1,561,371 | A * | 11/1925 | Strupe | G10D 13/04 248/150 |
| 1,715,559 | A * | 6/1929 | Long | A47C 4/286 108/34 |
| 1,940,565 | A * | 12/1933 | Schott | A47B 3/12 108/159 |
| 2,759,780 | A * | 8/1956 | Barker, Jr. | A47B 3/12 108/157.17 |
| 3,512,813 | A * | 5/1970 | Brimberg | E04G 7/18 403/218 |
| 3,709,167 | A | 1/1973 | Sprigman | |
| 4,027,988 | A * | 6/1977 | Kum | F16B 7/0493 403/218 |
| 4,695,179 | A * | 9/1987 | Schnell | E04G 7/14 403/24 |
| 4,934,638 | A * | 6/1990 | Davis | A47C 4/286 108/118 |
| 5,029,795 | A * | 7/1991 | Dexter | F16M 11/14 248/431 |
| 5,551,178 | A * | 9/1996 | Foley | G09F 15/0062 248/431 |
| 5,851,052 | A * | 12/1998 | Gustafsson | A47C 9/105 297/16.2 |
| 5,876,091 | A * | 3/1999 | Chernomashentsev | A47C 9/105 297/16.2 |
| 5,975,626 | A * | 11/1999 | Aycock | A47C 9/105 297/16.1 |
| 6,135,557 | A * | 10/2000 | Gustafsson | A47C 4/286 108/118 |
| 6,311,857 | B1 * | 11/2001 | Al-Darraji | A47G 25/0664 211/203 |
| 7,367,617 | B1 * | 5/2008 | Bond | A47C 4/286 248/431 |
| 7,384,097 | B2 * | 6/2008 | Park | A47C 4/286 297/16.1 |
| 7,401,850 | B2 * | 7/2008 | Micheel | A47C 9/105 108/118 |
| 8,444,097 | B2 * | 5/2013 | Morrow | F16M 11/38 248/164 |
| 8,720,896 | B2 * | 5/2014 | Matthis | F41J 1/10 273/407 |
| 9,402,467 | B2 * | 8/2016 | Baoqing | A47B 3/02 |
| 2007/0196196 | A1 * | 8/2007 | Schorling | F16B 21/04 411/555 |
| 2007/0216212 | A1 * | 9/2007 | Micheel | A47C 9/105 297/451.2 |
| 2007/0257540 | A1 * | 11/2007 | Park | A47C 4/286 297/451.2 |
| 2009/0166503 | A1 * | 7/2009 | Chiu | B25H 1/04 248/431 |
| 2011/0179566 | A1 * | 7/2011 | Yang | E03C 1/066 4/605 |
| 2018/0274274 | A1 * | 9/2018 | Naganuma | E05D 11/084 |

* cited by examiner

FRAME, MORE PARTICULARLY IN THE FORM OF A TRIPOD

BACKGROUND OF THE INVENTION

Field of the Invention

The invention relates generally to a frame, in particular in the form of a tripod, according to the features of the preamble of claim 1.

Description of Related Art

Tripods have been known for many years, e.g. to keep a grill grate adjustable in height above a campfire. Tripods are also used for camping chairs or outdoor tables, as these are not statically overdetermined, unlike furniture with four legs. A version of a tripod for barbecue use is available, for example, from Cathara-design.com. Here the metal rods are passed through a metal ring, and can thus be foldable into a space-saving transport position, in which the legs are aligned largely parallel. In the grill or general usage position, the rods are folded apart, i.e. the legs are aligned in a crossed manner. However, this frame is relatively unstable, as it may easily fall over due to bumping against the metal rods.

This also applies to frames in which the (three) legs are supported by a connecting block arranged approximately in the center. Such a construction is described in U.S. Pat. No. 4,934,638, wherein a seat surface is stretched at the upper end, which is screwed to the upper ends of the tubes which are telescopic there. This is relatively costly, especially since in the unloaded state the risk of unintentional knocking over still persists. In addition, premature wear is to be feared, since the pins at the point of rotation and/or connection are highly loaded, as are the tubular legs in this region, so that relatively thick-walled and thus heavy rods appear to be necessary.

BRIEF SUMMARY OF THE INVENTION

The invention is based on the task of improving a frame, in particular a tripod, in terms of stability, safety and construction effort.

This task is solved with a frame according to the features of claim 1.

Preferred configurations are subject of the subclaims.

The proposed construction gives the frame, especially in the form of a tripod, a particularly stable structure and high load-bearing capacity, since the surface pressure can be considerably reduced by the concave support surfaces which are in particular adapted to the leg surface, and thus also wear can be reduced in the event of frequent use or heavy loads. The legs thus support each other via the corresponding support surfaces, so that no further bracing is required. In kinematic inversion, these concave support surfaces can also be arranged on the legs themselves and the corresponding surfaces can be arranged on the connection part. In general, however, it is preferred to form the concave support surfaces on the central connection part, since this allows to easily form and produce rounded bearing surfaces for the legs in the folded transport position, preferably as metal casting. However, the central connection part may also be designed as a milled part, wherein radially outwardly projecting pins can also be produced in a single operation.

The proposed frame, especially in the form of a tripod, is suitable for many applications with elevated mounting of devices in the upper frame region above the connection part, e.g. for a grill bowl or fire bowl. There can also be arranged a seating or table surface, or a tub, especially a plant tub or beverage-cooling tub, or a sphere, especially a light sphere, can be inserted to be securely stored between the upper parts of the rod-like legs. These devices can also be easily pivoted in the frame above the stable connection node in an advantageous manner, for example to change the heat radiation of a fire bowl, whereby no fastening needs to be loosened. Due to the central attachment of the legs to the connection part, the frame can be easily folded into a space-saving transport position, wherein the legs are aligned largely parallel to each other for compact storage. In this case one of the support surfaces acts as a latch and/or positioning. For use, e.g. with the aforementioned devices, the frame can be quickly and easily unfolded into a stable usage position in which the legs are aligned in a crossed manner. The concavely curved support surfaces provided between the legs (six support surfaces for a tripod) enable precise positioning and a secure stand for the frame.

Preferably, the respective two support surfaces per leg directly adjoin each other so that their roundings merge into one another. There, at the transition, a pin may preferably be arranged to which the legs may be securely screwed. The tubular legs are made in particular of light metal (aluminum) and are stiffened to increase stability in the region of the connection part or the connection pins, in particular with a metal insert or a bushing in each case, which preferably runs in the axis direction of the connection screw. Stable screw bolts with a flat head can thus be screwed into the legs in countersunk form from the outside, preferably also into the largely radially extending pins. A spring, in particular a disk spring, may also be arranged on the screw bolt or the leg wall may be somewhat more compliant in the region of the contact surfaces in order to facilitate the transition between the usage and transport positions (and vice versa), in particular if a somewhat protruding latching lug is provided there for exact positioning of the legs selectively in the transport and/or usage position. This form-fit "latching" between the two positions of the legs is preferably designed as a gusset-like latching lug. However, if the positioning in the transport position is to be more emphasized, the latching lug is in each case aligned parallel to the legs or alternatively, parallel to the crossed leg position in usage position. In an advantageous manner, the legs are designed in multi-part form, in particular extendable with quick or screw connections, in order to keep the packing size of the frame compact, e.g. during shipping. In addition, this enables to easily change the height of the frame, e.g. from table height to chair height, by screwing on or clicking in additional rods. If, for example, three rods, each 50 cm long, are screwed onto the tripod in the lower region as an extension of the existing legs, this results in an elevated position, e.g. when used with a luminous globe or light sphere. This extension may also be made with plastic tubes or wooden rods, wherein the (middle) region at the connection part (possibly with the mentioned metal inserts) consists of metal in order to ensure the desired load-bearing capacity in cooperation with the support surfaces.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Figure 1A:
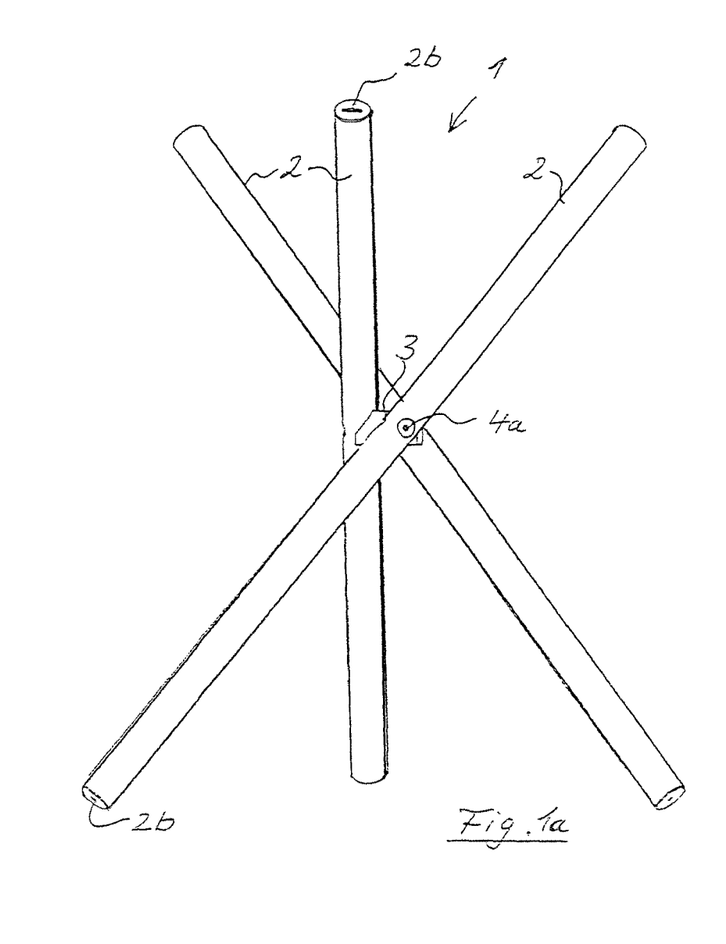
FIG. 1 a frame in the form of a tripod in three views (FIGS. 1a, 1b and 1c)
Figure 1B:
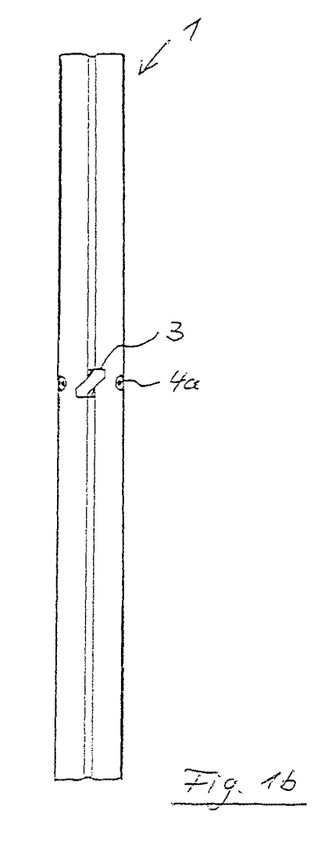
Figure 1C:
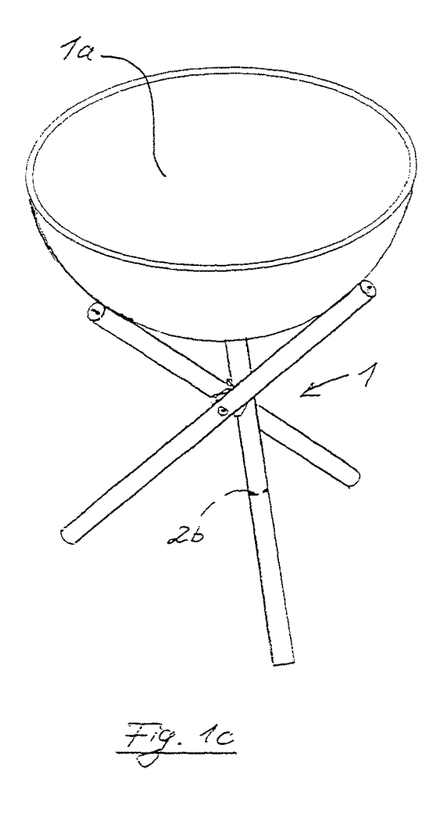

FIG. 1 shows a frame 1 in the form of a tripod, which here has three rod-shaped legs 2 that are fastened centrally to a connection part 3. In FIG. 1a, the frame 1 is unfolded in a usage position in which the legs 2 are aligned in a crossed manner with respect to each other in the direction of space, e.g. to accommodate a fire bowl 1a (see FIG. 1c) in the upper region. In this case, the fire bowl 1a (or a similar device, such as a light or a tub for cooling beverages drinks, etc.) may also be pivoted as required. In FIG. 1b, the frame 1 is shown in its space-saving transport position, wherein the three legs 2 are folded in a largely parallel alignment for being stacked in a compact manner, if necessary. Two end surfaces of the legs 2 are here provided with reference signs 2b to suggest quick or screw connections at which the legs 2 can be extended if necessary, for example to increase the standing height. Thus, the fire bowl may be arranged elevated according to FIG. 1c. However, the quick or screw connection 2b may also be arranged closer to the connection part 3, as indicated in dashed lines in FIG. 1c. This allows the legs 2 to be shortened, particularly in the transport position according to FIG. 1b, so as to take up smaller packing dimensions. The partial legs 2 can also be made of wooden rods or plastic tubes, while the central area is generally made of metal for stability reasons.

Figure 2:
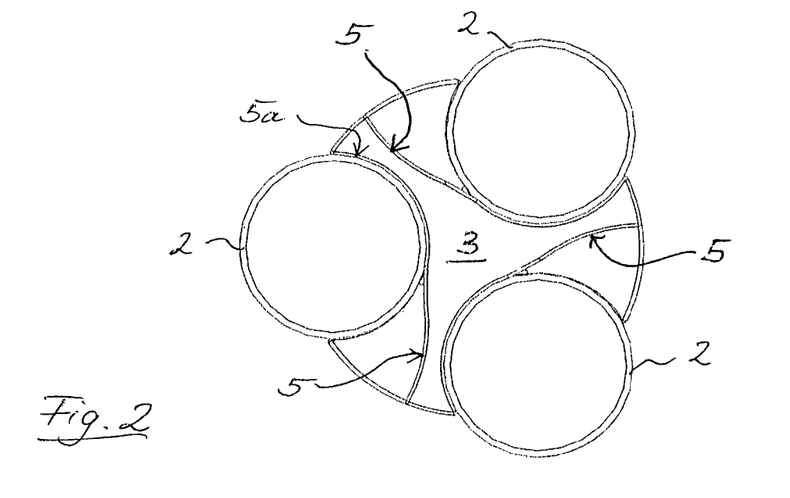
FIG. 2 a top view of the frame in transport position (according to FIG. 1b)

As shown in FIG. 2, two concavely curved support surfaces 5, 5' are provided on the connection part 3 and/or the (three) legs 2, respectively, against which the outer surface of the legs 2 can alternately nestle in the usage position, whereby the surface pressure at these contact surfaces is substantially reduced and thus the frame 1 is highly loadable. In the transport position shown here, i.e. with a top view according to FIG. 1b of the upper side of the connection part 3, the (convex) outer surfaces of the tubular legs 2 rest in a similarly shaped, concave bearing surface 5a and are thus positioned. During the transition to the usage position (cf. FIG. 3), the surfaces of the legs 2 are twisted over slight elevations in the form of latching lugs 5b in order to then rest against the concave support surfaces 5, 5' and thus be anchored in a form-fit manner. For clarification purposes, a distinction is made here between the upper support surfaces 5 and the lower support surfaces 5', which are arranged correspondingly for each leg 2.

Figure 3:
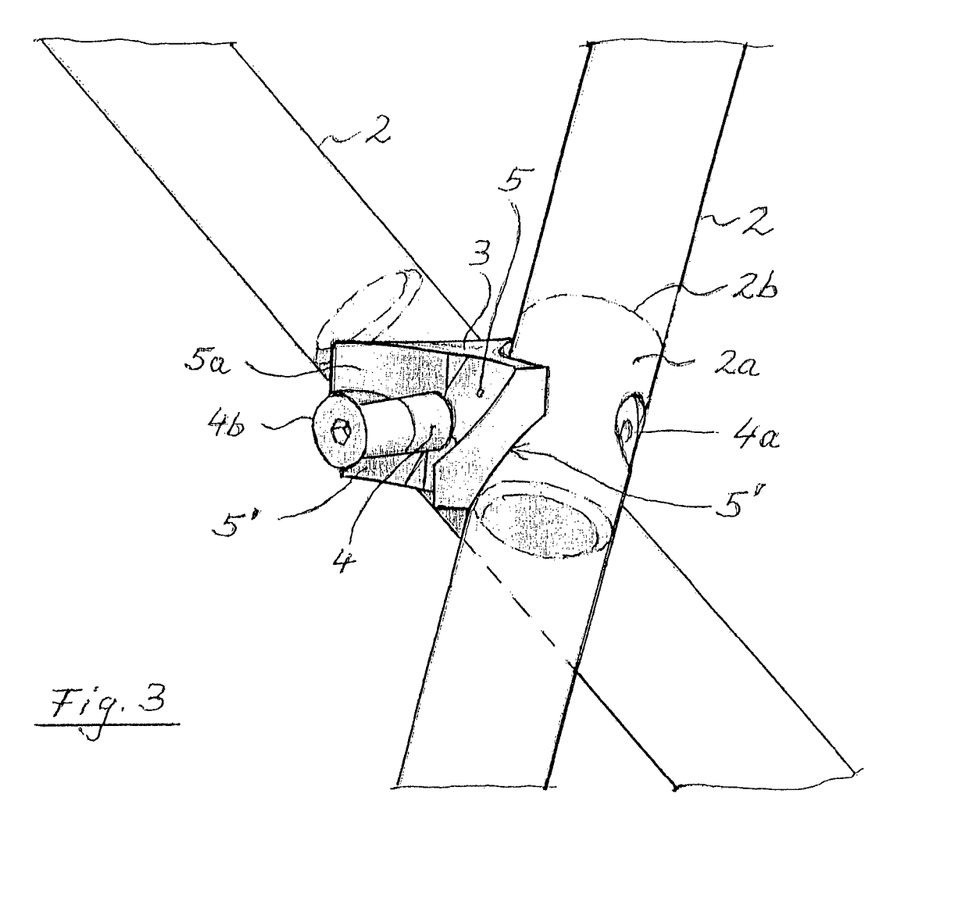
FIG. 3 a perspective view of the central connection part.
Figure 5:
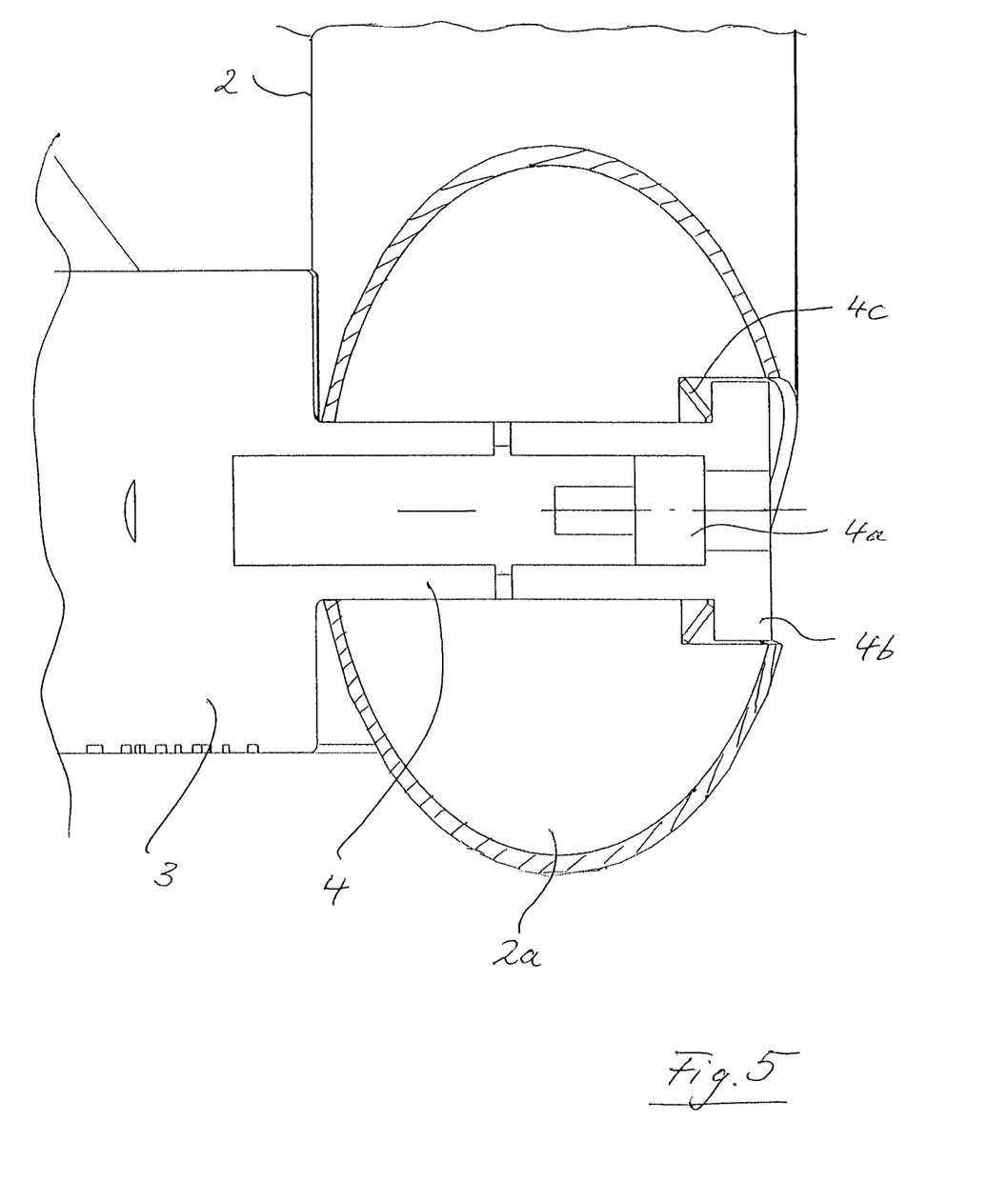
FIG. 5 a cross-sectional view of a leg with a screw connection.
Figure 6:
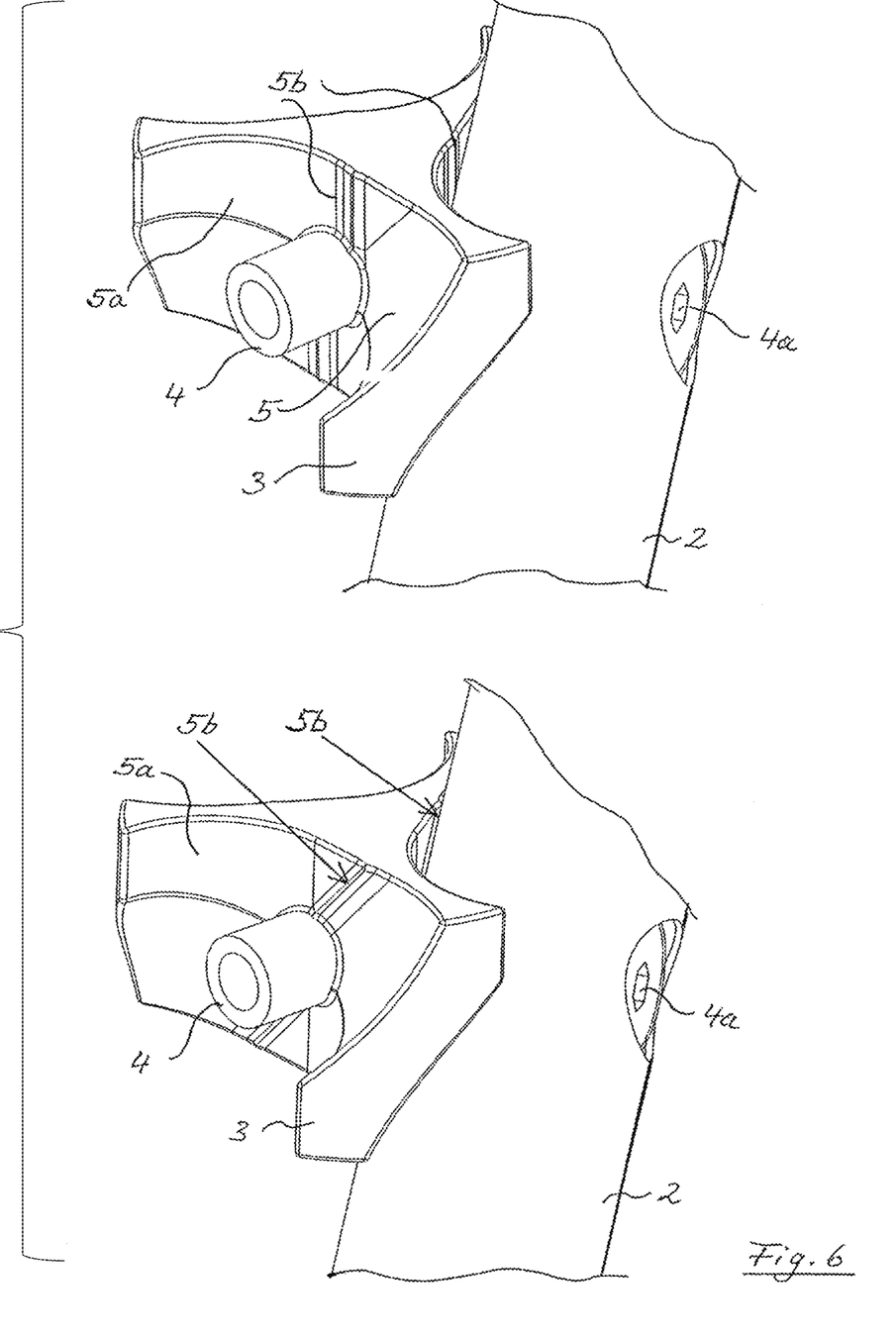
FIG. 6 two modified versions of latching lugs on the connection part.

As shown in FIG. 3, crossing into the usage position is performed by rotating the legs 2, here around radially aligned pins 4, which are respectively arranged between the rounded support surfaces 5 and 5', preferably adjacent to said latching lugs 5b (cf. also FIG. 6). The legs 2 (here the front leg is omitted for better illustration of pin 4) are preferably made of light metal tubes, as shown slightly shaded. To increase the stability of the frame 1, the tubular legs 2 can be stiffened in the region of the connection part 3, in particular with a metal insert 2a or a bushing (see FIG. 5). Bolts 4a (see also FIG. 1a) with a flat head 4b can be screwed into this pin 4 from the outside to ensure a flush, secure fastening in a countersunk manner. The connection part 3 is preferably manufactured as a metal casting, in particular together with radially aligned pins 4 or similar connecting elements, as shown in FIG. 4 in a slightly different perspective.

Figure 4:
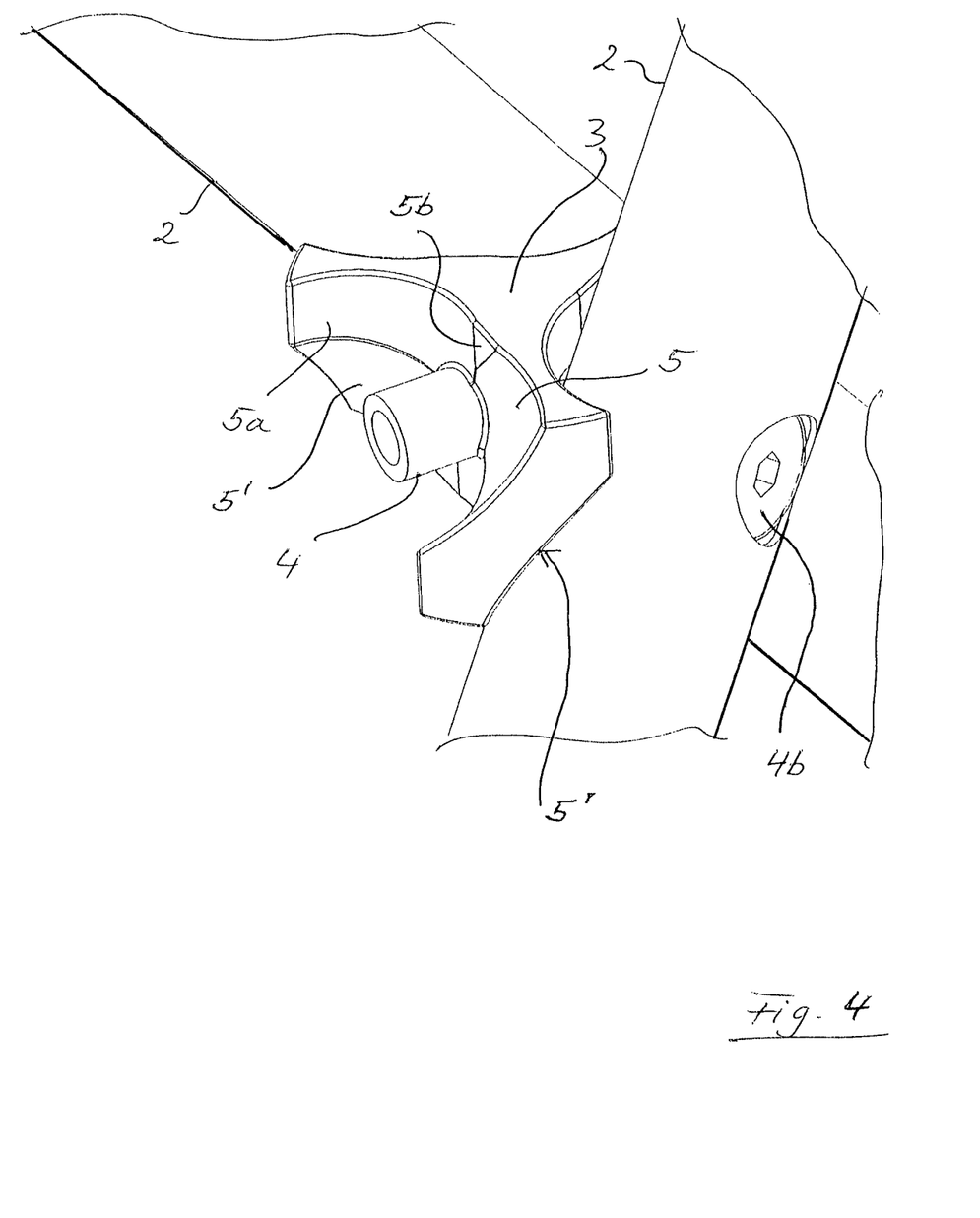
FIG. 4 a similar view as FIG. 3, with one leg omitted.

FIG. 4 also shows the transition between the respective concave roundings, as well as the latching lug 5b located in between, which is formed here in a gusset-like manner in order to form a "positioning stop" for the tube surface resting there in the usage position (FIG. 1a), but also in the transport position (FIG. 1b), respectively. Thus, an exact positioning for the legs 2 and precisely fitting contact either at the bearing surface 5a or in the (upper) support surface 5 is achieved, depending on the desired position (according to FIG. 1a or FIG. 1b). In the usage position, however, the rod or leg surface contacts not only the support surface 5 which is on top here, but also the lower support surface 5' which is arranged rotationally symmetrical to the axis of the pin 4. This significantly reduces the surface pressure and increases the load-bearing capacity.

In other words, when viewed in the axial direction to the pin 4, the upper support surface 5 extends analogously to a dial in the region from about 0 o'clock to 3 o'clock and the lower support surface 5' extends from about 6 o'clock to 9 o'clock. As can be seen from the leg 2 fastened with a flat head 4b, the leg surface nestles perfectly to the correspondingly rounded support surface 5'. It should be noted that despite the relatively low material thickness of the connection part 3 between the two support surfaces 5 and 5', a high stability is given, since the support forces at this location (directed largely downwards at the support surface 5 and directed upwards at the support surface 5') practically cancel each other out.

FIG. 5 shows a cross-section through a tubular leg 2 at the height of the connection part 3, wherein the sectional surface appears elliptical due to the inclined alignment of the leg (corresponding to FIG. 1a). It should be noted that the leg cross-section is not restricted to a cylindrical shape, but may also be elliptical or polygon, for example, in which case the shaping of the support surfaces 5, 5' is adapted accordingly. For axially somewhat compliant fastening, a spring 4c (in particular a disk spring) is arranged here between the pin 4 and the screw bolt 4a, so that the outer surface of the leg 2 slides more smoothly over the latching lug 5b during the transition between the bearing surface 5a and the support surface 5 (or vice versa). This may also be solved by a segment-like metal insert 2a, so that some tube deformation occurs. Similarly, the material cross-section could be weakened towards the latching lug, e.g. by a ground flattening which does not affect the bending strength of the leg 2 and the surface nestling (contact) with the support surfaces 5, 5'. Although the concave support surfaces 5, 5' are each shown here on the connection part 3 to interact with the convex outer surface of the respective leg 2, the support surfaces can—in kinematic reversal—also be formed on the legs 2 respectively, wherein the correspondingly adapted convex shape would then be formed on the connection part 3.

In FIG. 6, two alternatives to the above described gusset shape of the latching lug 5b between the support surfaces 5 and 5a are shown. In the upper illustration, the latching lug 5b is aligned parallel to the legs 3 in transport position (cf.

FIG. 1b) in each case, while in the lower part of the drawing, the alignment is designed parallel to the legs 3 in usage position (FIG. 1a or 1c).

In the above, first configuration according to FIGS. 1 to 6, the central connection part 3 is designed to be open radially outwards so that the legs 2 can be mounted particularly easily, i.e. they do not have to be threaded in as with rings. In addition, this open design offers an attractive appearance (cf. FIGS. 1a-1c), since the central connection part 3 is hardly visible. In addition, the open, star-shaped design offers significant advantages in manufacturing compared with a ring shape. For example, the support surfaces 5, 5' can be machined with high precision on a CNC milling center, in particular together with the pin 4 in one operation. Grinding heads with radial infeed (feed from the outside) can also be used to manufacture the support surfaces 5, 5' with high precision in the sense of an optimized contact ("nestling") and thus low surface pressure, which is hardly possible with ring shapes with poor accessibility.

Figure 7:
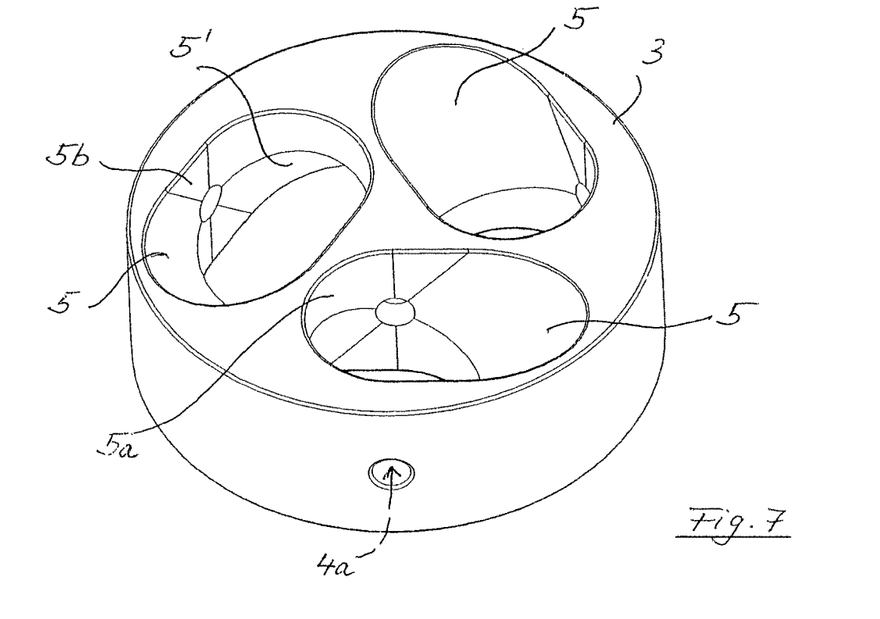
FIG. 7 an annular connection part (second configuration)

However, a ring shape has particular stability, so that here in FIG. 7 the connection part 3 is shown as a second configuration as a closed ring in which—in a tripod—three passages are provided. These each have the (upper) support surface 5 and also rounded (lower) support surface 5', which can be seen here at the left passage. As mentioned above, the support surface 5 is located in the first quadrant and the support surface 5' in the third quadrant of an imaginary dial or coordinate cross when viewed along the arrow 4a (for the screw-in direction of a grub screw sufficient here for pre-fixing the respective leg).

Figure 8:
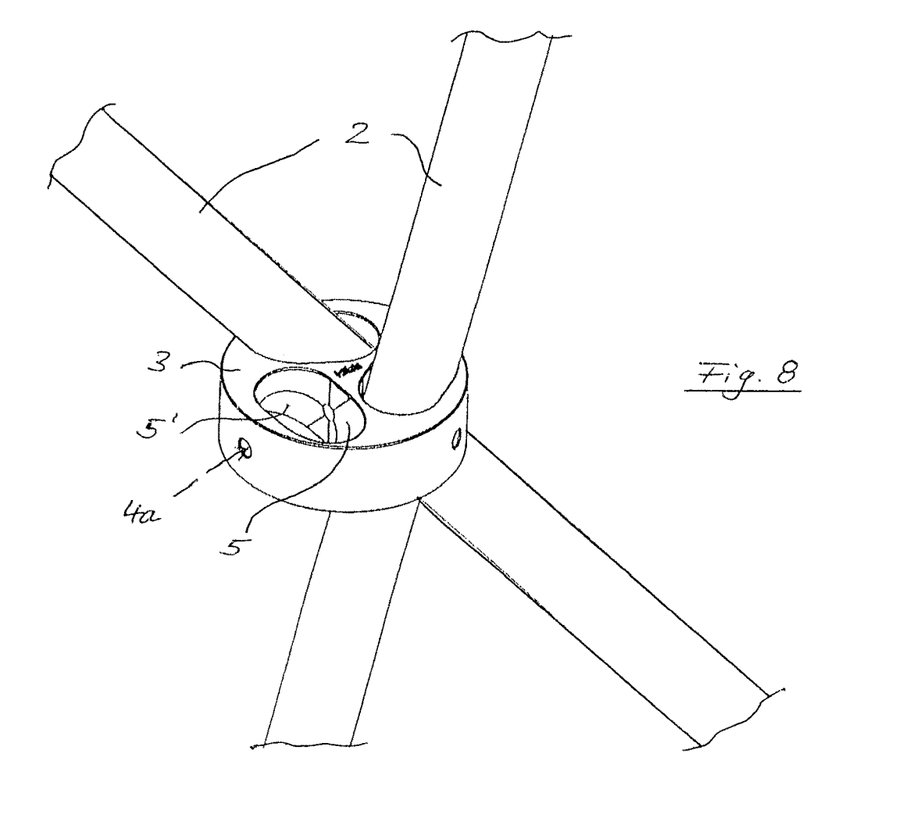
FIG. 8 a frame constructed therewith, wherein one leg is omitted for a detailed view.

FIG. 8 shows a frame constructed in this way, wherein one leg is omitted to illustrate the arrangement of the two support surfaces 5 and 5' in the above manner. The apparent "nestling" of the leg surface on the two quasi-opposite support surfaces 5 and 5' results in a particularly high load-bearing capacity of the frame 1 thus formed. As mentioned, however, the manufacture of the support surfaces 5, 5' is more complex here, since machining is hardly possible in a single clamping operation (as in the open design according to FIGS. 1 to 6). In addition, the material consumption in the second configuration (FIGS. 7 and 8) is considerably higher and thus also the weight. Especially in camping applications, the higher mass may be a disadvantage, as well as the more complicated assembly compared to the star-shaped design according to FIGS. 1 to 6.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A frame, having a plurality of elongated legs which are fastened centrally to a connection part, each leg having an exterior leg surface, wherein the frame can be folded into a space-saving transport position in which the legs are aligned generally parallel to one another, and the frame can be unfolded into a usage position in which the legs overlap one another at the connection part, the connection part includes at least one concavely rounded support surface for each leg for providing surface support, each concavely rounded support surface being in direct surface contact with a leg surface only in the usage position and spaced apart from the associated leg surface when the frame is in the space-saving transport position, and wherein the concavely rounded support surface of the connection part is disposed between two of the plurality of legs, wherein a pin for each leg is between two concavely rounded support surfaces, each pin extends outwards from the connection part, wherein the associated leg of a pin can rotate around the pin.

2. Frame according to claim 1, wherein the two concavely rounded support surfaces adjoining one another.

3. Frame according to claim 1, characterized in that each leg is tubular at its juncture with the connection part.

4. Frame according to claim 3, characterized in that each leg is stiffened directly adjacent the connection part by at least one of an insert, a bushing and an intermediate piece.

5. Frame according to claim 1, wherein each pin has a distal outside end, characterized in that a screw bolt is screwed into the distal outside end of each pin, each screw bolt having a flat head seated in a largely flush arrangement with respect to the leg surface of each leg.

6. Frame according to claim 5, characterized in that a spring is arranged on at least one of each screw bolt and each pin.

7. Frame according to claim 1, characterized in that the connection part is formed as a metal casting.

8. Frame according to claim 1, wherein in the usage position a portion of legs above the connection part comprises an upper part, characterized in that in the usage position the upper part forms a receiving area for an article selected from the group consisting essentially of a grill bowl and fire bowl and a seating surface and a table surface and a tub and a light sphere.

9. Frame according to claim 1 wherein the connection part includes a bearing surface associated with each leg, characterized in that a latching lug associated with each leg is formed between the support surfaces and the bearing surface, the latching lug is aligned parallel to each leg in either the transport position or the usage position.

10. Frame according to claim 1, wherein each leg has a length, characterized in that the legs are each length adjustable.

11. Frame according to claim 1, characterized in that the exterior leg surface of each leg is more compliant directly adjacent the connection part and less compliant in areas remote from the connection part.

12. A frame assembly for supporting an article in an elevated condition, said assembly comprising:

first and second and third legs, each of the first and second and third legs being of an elongated construction and extending between opposite ends, each of the first and second and third legs having a generally equal length, a connection part pivotally attached to each of the first and second and third legs generally centrally along the respective lengths thereof and wherein the connection part is located between the legs, the connection part configured to enable articulating movement of each leg between a space-saving transport position in which the first and second and third legs are aligned largely parallel and a usage position in which the first and second and third legs are splayed in a crossed manner with the respective ends thereof spread apart from one another, the plurality of legs overlapping one another at the connection part when in the usage position, the connection part including at least two concavely rounded support surfaces associated with a respective one of the legs, the at least two concavely rounded support surfaces arranged to provide surface support for the associated leg in the usage position, and wherein the concavely rounded support surfaces are disposed between the plurality of legs at the connection part, wherein each leg is a hollow tubular member, further including a stiffening insert disposed inside each of the first and second and third legs, each stiffening member traversing the connection part to reinforce the leg directly adjacent the connection part.

13. The frame of claim 12 wherein the connection part includes three circumferentially spaced pins, each pin pivotally joining the connection part to a respective leg, a fastener interacting with each pin to secure the leg thereto, and a biasing element operatively disposed between each fastener and the respective pin.

14. The frame of claim 12 wherein in the usage position the ends of the legs are spread apart from one another forming a receiving area for an article, further including an article supported in the spread apart ends of the legs configured in the usage position, the article selected from the group consisting essentially of: a grill bowl, a fire bowl, a seating surface, a table surface, a plant tub, a beverage-cooling tub, and a light sphere.

15. The frame of claim 12 wherein each concavely rounded support surfaces includes a latching lug, each latching lug being aligned parallel to its associated leg in either the transport position or the usage position.

16. A frame assembly for supporting an article in an elevated condition, said assembly comprising:

first and second and third legs, each of the first and second and third legs being of an elongated construction and extending between opposite ends, each of the first and second and third legs having a generally equal length, a connection part pivotally attached to each of the first and second and third legs centrally along the respective lengths thereof and wherein the connection part is located between the legs, the connection part configured to enable articulating movement of each leg between a space-saving transport position in which the first and second and third legs are aligned largely parallel and a usage position in which the first and second and third legs are splayed in a crossed manner with the respective ends thereof spread apart from one another, the plurality of legs overlapping one another at the connection part when in the usage position, the connection part including at least two concavely rounded support surfaces associated with a respective one of the legs, the at least two concavely rounded support surfaces arranged to provide surface support for the associated leg in the usage position, and wherein the concavely rounded support surfaces are disposed between the plurality of legs at connection part, wherein each concavely rounded support surfaces includes a latching lug, each latching lug being aligned parallel to its associated leg in either the transport position or the usage position.

17. The frame of claim 16 wherein the connection part includes three circumferentially spaced pins, each pin pivotally joining the connection part to a respective leg, a fastener interacting with each pin to secure the leg thereto, and a biasing element operatively disposed between each fastener and the respective pin.

18. The frame of claim 16 wherein in the usage position the ends of the legs are spread apart from one another forming a receiving area for an article, further including an article supported in the spread apart ends of the legs configured in the usage position, the article selected from the group consisting essentially of: a grill bowl, a fire bowl, a seating surface, a table surface, a plant tub, a beverage-cooling tub, and a light sphere.

19. A tripod frame assembly for supporting an article in an elevated condition, said assembly comprising:

first and second and third legs, each of the first and second and third legs being of an elongated construction and extending between opposite ends, each of the first and second and third legs having a length, the lengths being generally equal, a connection part pivotally attached to each of the first and second and third legs generally centrally along the length thereof and wherein the connection part is within the legs, the connection part configured to enable articulating movement of each leg between a space-saving transport position in which the first and second and third legs are aligned largely parallel and a usage position in which the first and second and third legs are splayed in a crossed manner with the ends thereof spread apart, the connection part including at least three pairs of concavely rounded support surfaces, one pair of concavely rounded support surfaces associated with each of the first and second and third legs, each pair of concavely rounded support surfaces arranged to provide surface support for a respective one of the first and second and third legs in the usage position, each pair of concavely rounded support surfaces including a gusset-shaped latching lug, each latching lug being aligned parallel to its associated leg in either the transport position or the usage position, the connection part including three circumferentially spaced pins, each pin pivotally joining the connection part to a respective leg, a fastener interacting with each pin to secure the associated leg thereto, a biasing element operatively disposed between each fastener and each pin.

* * * * *